United States Patent
Mizoguchi

(10) Patent No.: US 9,539,774 B2
(45) Date of Patent: Jan. 10, 2017

(54) METHOD FOR PRODUCING RESIN FILM, CASTING DIE, DEVICE FOR PRODUCING RESIN FILM, RESIN FILM, POLARIZING PLATE, AND LIQUID CRYSTAL DISPLAY DEVICE

(75) Inventor: Keisuke Mizoguchi, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 329 days.

(21) Appl. No.: 13/881,045

(22) PCT Filed: Aug. 29, 2011

(86) PCT No.: PCT/JP2011/004788
§ 371 (c)(1),
(2), (4) Date: Apr. 23, 2013

(87) PCT Pub. No.: WO2012/056619
PCT Pub. Date: May 3, 2012

(65) Prior Publication Data
US 2013/0207299 A1    Aug. 15, 2013

(30) Foreign Application Priority Data

Oct. 26, 2010    (JP) ................................ 2010-239799

(51) Int. Cl.
*B29D 7/01* (2006.01)
*B29C 41/28* (2006.01)
(Continued)

(52) U.S. Cl.
CPC ................. *B29D 7/01* (2013.01); *B29C 41/28* (2013.01); *G02B 5/0242* (2013.01);
(Continued)

(58) Field of Classification Search
CPC ......... B29C 41/28; G02B 5/0242; G02B 5/00; B29D 7/01
(Continued)

(56) References Cited

U.S. PATENT DOCUMENTS 4,818,464 A * 4/1989 Lau ............................... 264/510
5,030,409 A * 7/1991 Hisanaga et al. ............. 264/556
(Continued)

FOREIGN PATENT DOCUMENTS

JP    2-276607 A    11/1990
JP    2006-289888 A    10/2006
(Continued)

OTHER PUBLICATIONS

International Search Report for PCT/JP2011/004788 dated Sep. 20, 2011.

*Primary Examiner* — Nahida Sultana
(74) *Attorney, Agent, or Firm* — Lucas & Mercanti, LLP

(57) ABSTRACT

An aspect of the present invention is a method for producing a resin film, including a casting step of casting a resin solution containing a transparent resin from a casting die onto a running support to form a cast membrane, and a releasing step of releasing the cast membrane from the support, wherein, in the casting step, a velocity at which the resin solution is discharged from longitudinally opposite ends of a discharge port of the casting die is 0.95 times to 1.5 times a velocity at which the resin solution is discharged from a longitudinally central portion of the discharge port of the casting die.

6 Claims, 4 Drawing Sheets

(51) Int. Cl.
  *G02B 5/02* (2006.01)
  *B29K 1/00* (2006.01)
  *G02B 5/30* (2006.01)
  *G02F 1/1335* (2006.01)

(52) U.S. Cl.
  CPC ......... *G02B 5/0268* (2013.01); *G02B 5/0278* (2013.01); *G02B 5/0294* (2013.01); *B29K 2001/00* (2013.01); *G02B 5/3033* (2013.01); *G02F 1/133528* (2013.01)

(58) Field of Classification Search
  USPC ............ 264/212, 2, 1.34, 216, 288.4, 290.2; 425/224, 447
  See application file for complete search history.

(56) References Cited

U.S. PATENT DOCUMENTS

| | | | | |
|---|---|---|---|---|
| 6,221,301 | B1* | 4/2001 | Tsunashima et al. | 264/466 |
| 2004/0027509 | A1* | 2/2004 | Arai et al. | 349/56 |
| 2007/0145615 | A1* | 6/2007 | Heki | B29C 43/22 264/1.34 |
| 2008/0182091 | A1* | 7/2008 | Guenanten | B29C 47/0021 428/220 |
| 2008/0258335 | A1 | 10/2008 | Abiru | |
| 2008/0274223 | A1* | 11/2008 | Cloeren | B29C 47/0019 425/133.5 |
| 2009/0246416 | A1* | 10/2009 | Kawabe | C08K 5/1535 428/1.31 |
| 2010/0040806 | A1* | 2/2010 | Suzuki | B29C 47/0021 428/1.31 |
| 2010/0148392 | A1* | 6/2010 | Tonohara | B29C 41/28 264/212 |
| 2010/0151156 | A1* | 6/2010 | Kawabe | B29C 47/0078 428/1.31 |
| 2010/0152340 | A1* | 6/2010 | Kanemura | B29C 41/28 524/91 |
| 2010/0179263 | A1* | 7/2010 | Heki | B29C 47/8845 524/291 |
| 2010/0221522 | A1* | 9/2010 | Mrozinski | B01D 67/0011 428/315.5 |
| 2010/0239837 | A1* | 9/2010 | Hagiwara | B29C 47/0021 428/220 |

FOREIGN PATENT DOCUMENTS

| | | |
|---|---|---|
| JP | 2007-101625 A | 4/2007 |
| JP | 2008-194956 A | 8/2008 |
| JP | 2008-265271 A | 11/2008 |
| JP | 2009-234169 A | 10/2009 |

* cited by examiner

METHOD FOR PRODUCING RESIN FILM, CASTING DIE, DEVICE FOR PRODUCING RESIN FILM, RESIN FILM, POLARIZING PLATE, AND LIQUID CRYSTAL DISPLAY DEVICE

CROSS REFERENCE TO RELATED APPLICATION

This application is a 371 a PCT/JP2011/004788 filed on Aug. 29, 2011, which claimed the priority of Japanese Patent Application No. 2010-239799 filed on Oct. 26, 2010, both applications are incorporated herein by reference in its entirety.

TECHNICAL FIELD

The present invention relates to a method for producing a resin film, a casting die for use in the producing method, a device for producing a resin film which device includes the casting die, a resin film obtained by the producing method, a polarizing plate including the resin film used as a transparent protective film, and a liquid crystal display device including the polarizing plate.

BACKGROUND ART

Resin films are used in various fields, for example, for liquid crystal display devices, in view of their chemical characteristics, mechanical characteristics, electrical characteristics, and the like. Specifically, various resin films, for example, transparent protective films for protecting polarizing elements on a polarizing plate are arranged in an image display area of a liquid crystal display device. As such resin films, for example, cellulose ester films which are excellent in transparency are widely used.

A resin film such as a cellulose ester film can be produced using a resin solution (dope) in which a material resin such as a cellulose ester resin is dissolved into a solvent. Specifically, a method for producing a resin film using such dope includes, for example, a solution cast film-forming method. The solution cast film-forming method is used for producing an elongate resin film by casting dope on a running support to form a cast membrane, drying the cast membrane to the degree that the cast membrane can be released, releasing the cast membrane from the support to obtain a film, and conveying the released film by a conveying roller, while performing a drying operation, a stretching operation, and the like on the film.

Furthermore, there has been a demand to increase the size of screens of image forming apparatuses, particularly liquid crystal display devices used as television receivers. Hence, resin films produced for application to image forming apparatuses have been demanded to be wide. A possible method for producing a wide film by the solution cast film-forming method is to use a wide support to increase the width of a cast membrane cast on the support.

However, conventionally, when a wide film is produced by increasing the width of the cast membrane, the resin film obtained tends to be likely to be defective as a result of entrainment of bubbles in ends of the resin film. Even when the resin film is thus defective at the ends thereof, a central portion of the resin film can be utilized by cutting the defective ends. However, there has been a demand to minimize the cut areas in the ends in order to increase the width of the resin film.

Examples of a method for producing a resin film are described in Patent Documents 1 to 3.

Patent Document 1 describes a method for producing an optical film by the solution cast film-forming method, in which a resin solution (dope) cast on a casting surface of a casting support at widthwise opposite ends thereof is lower in viscosity than dope cast on the casting surface of the casting support in a widthwise central portion thereof.

Patent Document 1 discloses an optical film which can be produced to have a large width with the planarity thereof kept uniform so that even the widthwise opposite ends thereof are usable, allowing productivity to be significantly improved.

Furthermore, Patent Document 2 describes a method for producing a propylene film by extruding a propylene resin through a T die having a ceramics sprayed portion formed at an edge of a lip opening in the die by spraying a ceramic material at the edge.

Patent Document 2 discloses that a propylene film can be obtained which avoids being contacted by and mixed with foreign matter adhering to a lip portion surrounding the lip opening in the die.

Additionally, Patent Document 3 describes a method for producing a cellulose resin film in accordance with a molten-resin cast film-forming method, the producing method including discharging a molten resin melted by an extruder from a die onto a running or rotating cooling support in the form of a sheet to cool and solidify the molten resin, wherein a contact portion of the die that comes into contact with the molten resin has a surface roughness of 0.3 µm or less, a contact angle of 50° or more, and a surface energy of 60 mN/m or less.

Patent Document 3 discloses that when the molten resin is discharged from the die, possible streak defects are suppressed which may degrade the surface quality of the film, thus allowing a cellulose resin film with excellent optical characteristics to be produced at a high production efficiency.

Patent Document 1: Japanese Patent Application Laid-Open No. 2009-234169
Patent Document 2: Japanese Patent Application Laid-Open No. 2006-289888
Patent Document 3: Japanese Patent Application Laid-Open No. 2008-194956

SUMMARY OF THE INVENTION

An object of the present invention is to provide a method for producing a resin film restrained from becoming defective at ends thereof. Another object of the present invention is to provide a casting die for use in the producing method, a device for producing a resin film which device includes the casting die, a resin film obtained by the producing method, a polarizing plate including the resin film used as a transparent protective film, and a liquid crystal display device including the polarizing plate.

An aspect of the present invention is a method for producing a resin film, including a casting step of casting a resin solution containing a transparent resin from a casting die onto a running support to form a cast membrane, and a releasing step of releasing the cast membrane from the support, wherein, in the casting step, a velocity at which the resin solution is discharged from longitudinally opposite ends of a discharge port of the casting die is 0.95 times to 1.5 times a velocity at which the resin solution is discharged from a longitudinally central portion of the discharge port of the casting die.

Another aspect of the present invention is a casting die for casting a resin solution containing a transparent resin onto a running support to form a cast membrane, the die including a slit portion through which the resin solution passes, wherein longitudinally opposite ends of the slit portion are subjected to a surface treatment in such a manner that a velocity at which the resin solution is discharged from longitudinally opposite ends of a discharge port of the casting die is 0.95 times to 1.5 times a velocity at which the resin solution is discharged from a longitudinally central portion of the discharge port of the casting die.

Another aspect of the present invention is a device for producing a resin film, including a support that is able to run, a casting die for casting a resin solution containing a transparent resin onto the running support to form a cast membrane on the support, and a releasing portion that releases the cast membrane from the support, the casting die being the above-described casting die.

Another aspect of the present invention is a resin film obtained by the method for producing a resin film.

Another aspect of the present invention is a polarizing plate including a polarizing element and a transparent protective film disposed on a surface of the polarizing element, wherein the transparent protective film is the above-described resin film.

Another aspect of the present invention is a liquid crystal display device including a liquid crystal cell and two polarizing plates disposed to sandwich the liquid crystal cell therebetween, wherein at least one of the two polarizing plates is the above-described polarizing plate.

The objects, features, aspects, and advantages of the present invention will be more apparent from the detailed description below and the attached drawings.

BEST MODE FOR CARRYING OUT THE INVENTION

Figure 1:
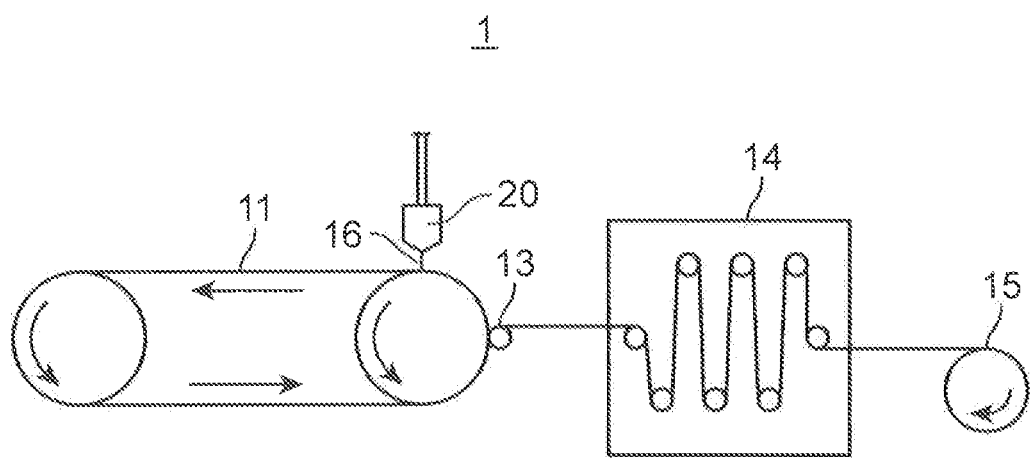
FIG. 1 is a schematic diagram showing a basic configuration of a resin film producing device according to an embodiment of the present invention.

The producing method described in Patent Document 1 can produce a preferred wide film but requires the use of two or more types of dope with different viscosities.

Furthermore, the producing methods described in Patent Document 2 and Patent Document 3 allow dope to be preferably discharged through a discharge port in a casting die and fail to vary the properties of the discharge port of the casting die such as the surface roughness thereof in the longitudinal direction thereof. Thus, the inventors' experiments indicate that the producing methods fail to restrain the obtained resin film from becoming defective at the ends thereof. Moreover, the producing methods described in Patent Document 2 and Patent Document 3 focus on, for example, the preferred discharge of a resin melt from the casting die in accordance with the molten-resin cast film-forming method. The producing methods are not intended to restrain a resin film formed by the solution cast film-forming method from becoming defective at the ends thereof.

Thus, the inventors assumes the reason why the resin film becomes defective at the ends thereof as follows.

First, the inventors have noted that a resin solution (dope) discharged from longitudinally opposite ends of the discharge port of the casting die come into contact with (land on) a support at a position farther from the casting die than dope discharged from a longitudinally central portion of the discharge port of the casting die.

Thus, the inventors assume as follows. The velocity at which the dope is discharged from the longitudinally opposite ends of the discharge port of the casting die (the velocity of the dope discharged from the opposite ends) tends to be slightly lower than the velocity at which the dope discharged from a longitudinally central portion of the discharge port of the casting die (the velocity of the dope discharged from the central portion) due to fluid friction with end surfaces or the like unless the discharge port or the like is subjected to a certain treatment. That is, when the dope is discharged at a high velocity through the discharge port of the casting die, the dope tends to be unlikely to be drawn by the support and to land on the support at a relatively high velocity. In contrast, when the dope is discharged at a low velocity through the discharge port of the casting die, the dope tends to be likely to be drawn by the support and fail to land on the support until relatively late.

Thus, the inventors assume as follows. Even when the velocity at which the dope is discharged from the longitudinally central portion of the discharge port of the casting die is set to a preferred value, the velocity at which the dope is discharged from the longitudinally opposite ends of the discharge port of the casting die is lower than the preferred velocity. Hence, the dope discharged from the longitudinally opposite ends lands on the support at a position excessively far from the casting die. Thus, when the dope from the longitudinally opposite ends of the discharge port of the casting die lands on the support at an excessively far from the casting die, bubbles are likely to be entrained in ends (ends of a cast membrane), in a direction orthogonal to a conveying direction, of a cast membrane formed by the landing of the dope on the support. Consequently, the ends of the resin film formed may become defective as a result of the entrainment of bubbles.

The inventors further assume as follows. Ends of the support in a direction orthogonal to a running direction are likely to vibrate, and this vibration tends to vibrate ends of the cast membrane formed by casting of the dope on the support. This tendency is more significantly observed in wide supports. Thus, the ends of the cast membrane are undulated by the vibration, resulting in the likelihood of surface defects such as lateral steps on the ends of the resin film obtained. Hence, optical values for the ends of the resin film are likely to vary.

The inventors thus assume that since the velocity at which the dope is discharged through the discharge port varies depending on the longitudinal position on the discharge port of the casting die, the ends of the resin film become defective as a result of the entrainment of the dope or the vibration of the support.

Thus, focusing on the impact, on the dope discharge velocity, of the longitudinal position on the discharge port of the casting die, the inventors conducted various experiments. As a result, the inventors have found that the above-described objects are accomplished by the present invention.

An embodiment of a method for producing a resin film according to the present invention will be described. However, the present invention is not limited to this.

The method for producing a resin film according to the present embodiment is based on what is called a solution cast film-forming method and includes a casting step of casting a resin solution (dope) containing a transparent resin from a casting die onto a running support to form a cast membrane (web), and a releasing step of releasing the cast membrane from the support to obtain a film. Furthermore, the method for producing a resin film generally includes, in addition to these steps, a drying step of drying the released film, and may further include a stretching step of stretching the released film. The method for producing a resin film is carried out by such a device as shown in FIG. 1, which produces a resin film in accordance with a solution cast film-forming method. The device for producing a resin film is not limited to the device shown in FIG. 1 but may have another configuration. Furthermore, FIG. 1 is a schematic diagram showing a basic configuration of the device for producing a resin film according to an embodiment of the present invention.

The method for producing a resin film according to the present embodiment will be described. In the casting step, the velocity at which the resin solution is discharged from the longitudinally opposite ends of the discharge port of the casting die (the velocity of the dope discharged from the opposite ends) is preferably 0.95 times to 1.5 times, and more preferably 0.97 times to 1.2 times the velocity at which the resin solution is discharged from the longitudinally central portion of the discharge port of the casting die (the velocity of the dope discharged from the central portion). That is, the ratio of the velocity of the dope discharged from the opposite ends to the velocity of the dope discharged from the central portion is preferably 0.95 to 1.5, and more preferably 0.97 to 1.2.

When the velocity of the dope discharged from the opposite ends is excessively low compared to the velocity of the dope discharged from the central portion, the ends of the resin film obtained tend to be defective as a result of the entrainment of bubbles or a variation in the optical values. This is expected to occur as described below.

The tendency of the resin film is such that even when the velocity of the dope discharged from the central portion is set to a preferred value, the velocity of the dope discharged from the opposite ends is excessively low, thus causing the dope from the opposite ends to be excessively drawn by the support. That is, the dope from the opposite ends tends to land on the support at a position excessively far from the casting die. In such a case, the following is expected to occur. Bubbles are likely to be entrained in the ends of the cast membrane formed by the landing of the dope on the support. Thus, the ends of the resin film obtained are likely to become defective as a result of the entrainment of bubbles. Moreover, the low velocity of the dope discharged from the opposite ends prevents vibration from being sufficiently suppressed at the ends of the support. The vibrating ends of the support cause the ends of the cast membrane to be undulated, leading to surface defects such as lateral steps on the ends of the resin film. This may result in defects such as a variation in the optical values for the ends.

Furthermore, when the velocity of the dope discharged from the opposite ends is excessively high compared to the velocity of the dope discharged from the central portion, the central portion of the resin film tends to become defective as a result of the entrainment of bubbles. This is expected to occur as described below.

When the velocity of the dope discharged from the opposite ends is excessively high, the dope from the central portion tends to be excessively drawn by the support. That is, the dope from the central portion tends to land on the support at a position excessively far from the casting die. In such a case, the following is expected to occur. Bubbles are likely to be entrained in the central portion of the cast membrane formed by the landing of the dope on the support. Thus, the central portion of the resin film obtained is likely to become defective as a result of the entrainment of bubbles.

Furthermore, it tends to be difficult to set the velocity of the dope discharged from the opposite ends more than 1.5 times the velocity of the dope discharged from the central portion set to the preferred value, because of the excessively high velocity at which the dope is discharged from the opposite ends.

Therefore, when, in the casting step, the velocity of the dope discharged from the opposite ends is set 0.95 times to 1.5 times the velocity of the dope discharged from the central portion, a resin film can be easily produced which is restrained from becoming defective at the ends thereof.

The dope discharge velocity can be measured by a well-known method. Specifically, a common current meter may be used for the measurement. According to the present embodiment, current meters may be installed immediately below three positions on the discharge port of the casting die, that is, the central portion of the discharge port and the opposite ends of the discharge port. The current meters can measure the velocity of the dope discharged from the central portion and the velocity of the dope discharged from the opposite ends.

Furthermore, one of the opposite ends is an area occupying 1% to 10% of the longitudinal length of the discharge port from the corresponding end. That is, the opposite ends are two areas each occupying 1% to 10% of the longitudinal length of the discharge port from the corresponding end. The central portion is the entire discharge port except for the opposite ends thereof. Specifically, for example, if the discharge port is 3,000 mm in longitudinal length, one of the opposite ends is an area having a length of 30 mm to 300 mm from the corresponding end. Since the opposite ends are areas each having a length of 30 mm to 300 mm from the corresponding end, the area occupying the central portion is 2,400 mm to 2,940 mm in longitudinal length.

Furthermore, a method for adjusting the dope discharge velocity depending on the area is not particularly limited as long as the discharge velocity meets the above-described relations. Specifically, examples of the casting die used include a casting die with a slit portion through which a resin solution passes and which is subjected to a surface treatment at the longitudinally opposite ends thereof, a casting die with a slit portion through which a resin solution passes and which is subjected to a surface treatment in the longitudinally central portion thereof, and a casting die in which the size of the opening in the slit portion varies depending on each area of the slit portion. The casting die in which the size of the opening in the slit portion varies depending on each area can be implemented by making the slit portion narrower at the longitudinally opposite ends than in the longitudinally central portion.

A case described below uses a casting die with a slit portion through which a resin solution passes and which is subjected to a surface treatment at longitudinally opposite ends thereof.

FIG. 1 is a schematic diagram showing a basic configuration of a device 1 for producing a resin film by a solution cast method using an endless belt support 11. The device 1 for producing a resin film includes the endless belt support 11, a casting die 20, a releasing roller 13, a drying device 14, and a winding device 15. The casting die 20 discharges a resin solution (dope) 16 containing a transparent resin in the form of a ribbon to cast the resin solution 16 onto a surface of the endless belt support 11. The endless belt support 11 is supported so as to be able to be driven by a pair of a driving roller and a driven roller. The endless belt support 11 allows the resin solution 16 cast by the casting die 20 to be formed into a cast membrane (web) and conveys the cast membrane, while drying the cast membrane to the degree that the cast membrane can be released by the releasing roller 13. The releasing roller 13 releases the dried cast membrane from the endless belt support 11. The released cast membrane is further dried by the drying device 14. The dried cast membrane is wound around the winding device 15 to obtain a resin film.

As shown in FIG. 1, the endless belt support 11 is a metal endless belt having a mirror surface and running infinitely. The belt is preferably formed of, for example, stainless steel in view of its ability to release the cast membrane from the endless belt support 11. The width of the cast membrane cast by the casting die 20 is preferably set to 80% to 99% of the width of the endless belt support 11 in view of the effective use of the width of the endless belt support 11. To eventually obtain a resin film with a width of 1,500 mm to 3,000 mm, the endless belt support 11 preferably has a width of 1,800 mm to 4,500 mm. Alternatively, instead of the endless belt support, a metal drum having a mirror surface and which is rotatable (endless drum support) may be used.

Figure 2:
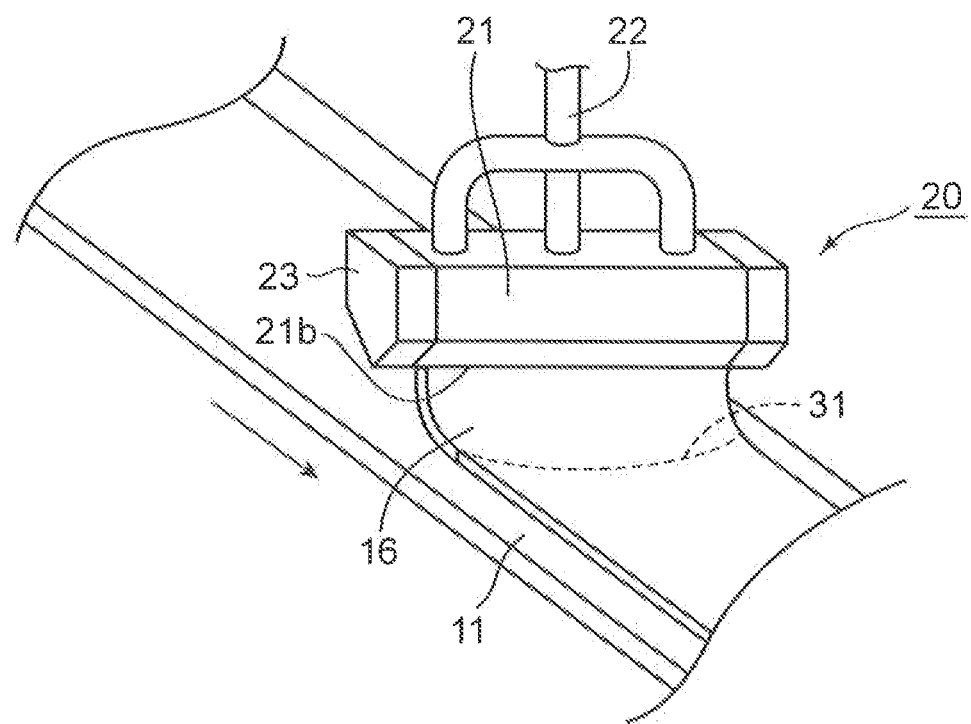
FIG. 2 is a schematic perspective view showing surroundings of a casting die according to the embodiment of the present invention.
Figure 3:
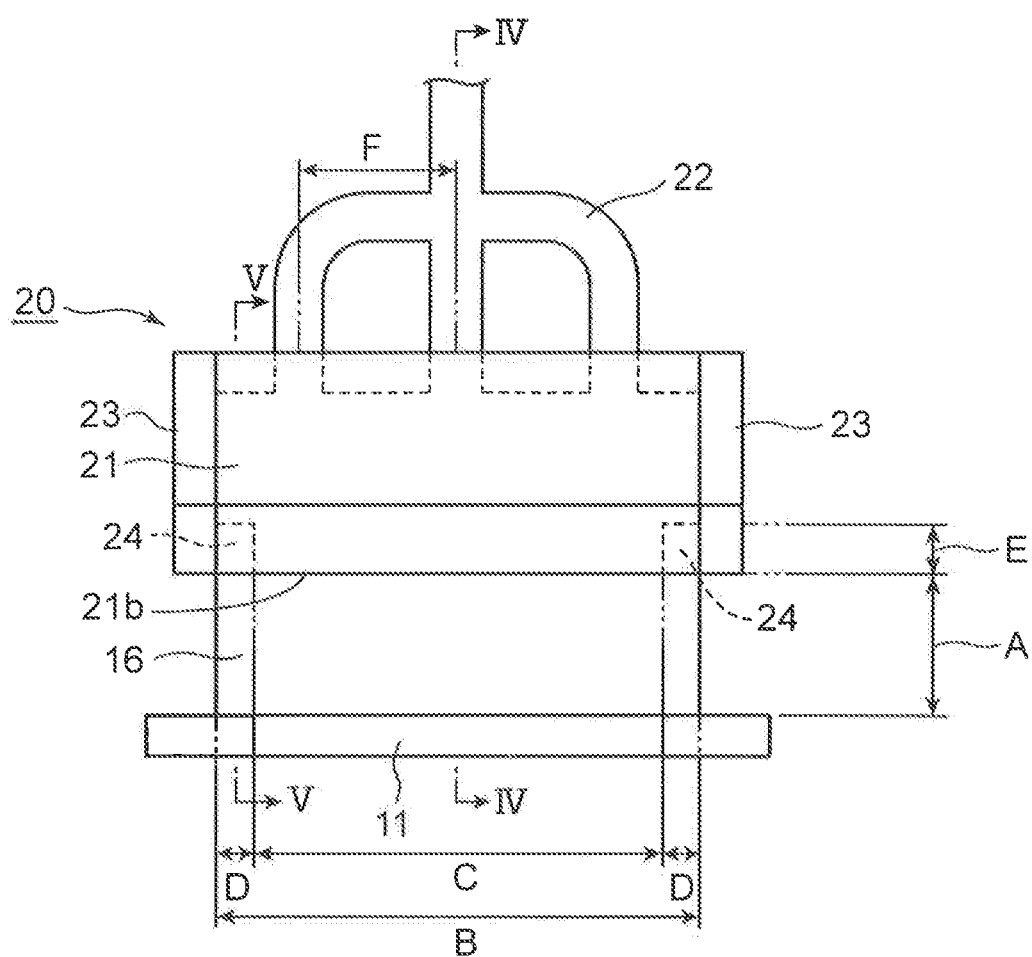
FIG. 3 is a side view of the casting die as viewed from a downstream side of an endless belt support in a running direction thereof according to the embodiment of the present invention.
Figure 4:
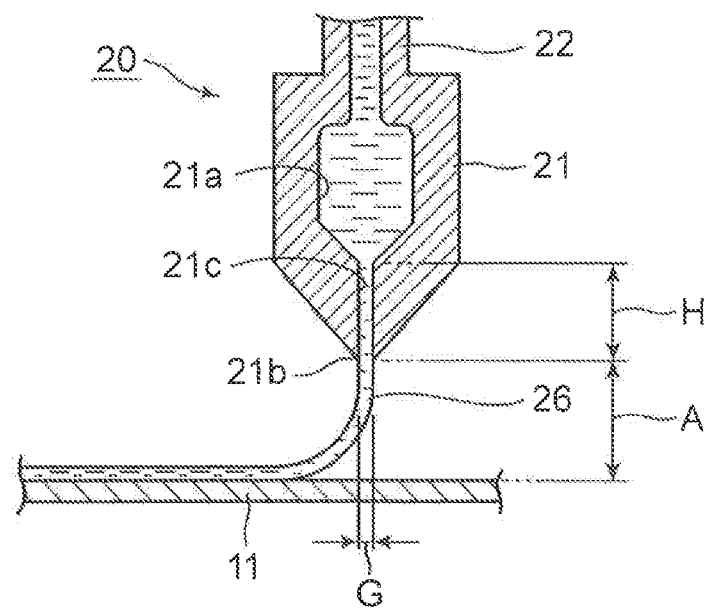
FIG. 4 is a cross-sectional view of the casting die as viewed from a section line IV-IV in FIG. 3.
Figure 5:
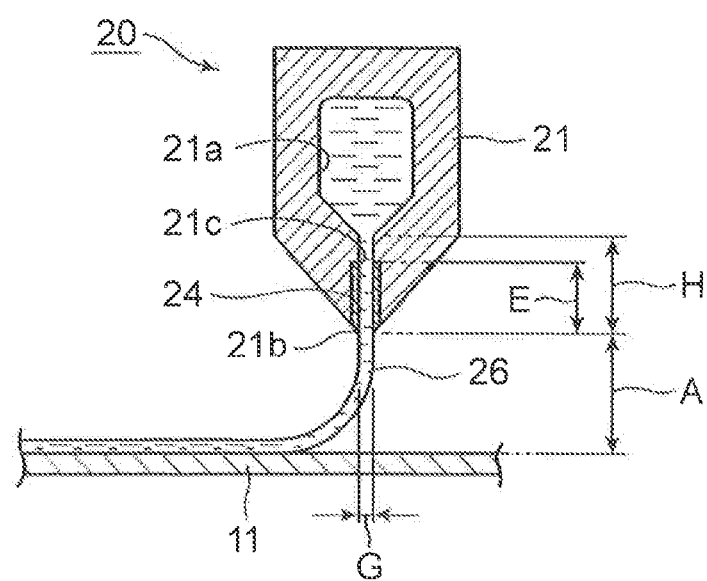
FIG. 5 is a cross-sectional view of the casting die as viewed from a section line V-V in FIG. 3.

FIG. 2 is a schematic perspective view showing surroundings of the casting die 20. FIG. 3 is a side view of the casting die 20 as viewed from a downstream side of the endless belt support 11 in the running direction thereof. FIG. 4 is a cross-sectional view of the casting die 20 as viewed along a section line IV-IV in FIG. 3. FIG. 5 is a cross-sectional view of the casting die 20 as viewed along a section line V-V in FIG. 3.

As shown in FIG. 2 to FIG. 5, the casting die 20 includes a casting die main body 21, a dope feeding pipe 22, and side plates 23. As shown in FIG. 4, the dope feeding pipe 22 is connected to an upper end of the casting die main body 21 to feed the dope 16 into the casting die main body 21. As shown in FIG. 4 and FIG. 5, the casting die main body 21 includes a manifold portion 21a that allows the dope 16 to be stably cast onto the endless belt support 11, a discharge port 21b through which the dope 16 is discharged and cast onto the endless belt support 11, and a slip portion 21c formed between the manifold portion 21a and the discharge port 21b to allow the dope to pass from the manifold portion 21a toward the discharge port 21b. The side plates 23 are provided at opposite side ends of the casting die main body 21 in a longitudinal direction thereof (a direction substantially orthogonal to the conveying direction of the endless belt support 11). As shown in FIG. 3, the distance between the side plates 23 provided on the opposite side ends of the casting die main body 21 in the longitudinal direction thereof defines the length of the discharge port 21b of the casting die main body 21 in the longitudinal direction thereof, that is, the length of the ribbon-shaped resin solution 16 in the width direction thereof.

As shown in FIG. 2, the discharge port 21b is formed on a ridge line of the casting die main body 21 which is closer to the endless belt support 11. As shown in FIG. 2, the ridge line extends in a direction substantially orthogonal to the running direction of the endless belt support 11. A distance A between the discharge port 21b and the endless belt support 11 is preferably 200 μm to 5,000 μm. When the distance A is excessively short, the casting die 20 may come into contact with the endless belt support 11. When the distance A is excessively long, the casting ribbon tends to be likely to be affected by an external factor such as wind.

As shown in FIG. 3, the dope feeding pipe 22 branches into three pipes connected to the casting die main body 21. However, the number of branches is not limited. The dope feeding pipe 22 may have no branch, two branches, or four or more branches. The number of branches from the dope feeding pipe 22 is preferably about two to four so as to allow the dope 16 to be stably supplied to the casting die main body 21.

Furthermore, the slit portion 21c of the casting die 20 is subjected to a surface treatment at the longitudinally opposite ends thereof so that the velocity of the dope discharged from the opposite ends is 0.95 times to 1.5 times the velocity of the dope discharged from the central portion. The surface treatment is not particularly limited provided that the surface treatment makes the velocity of the dope discharged from the opposite ends 0.95 times to 1.5 times the velocity of the dope discharged from the central portion. Specifically, the surface treatment is, for example, ultrachrome plating treatment.

Furthermore, as shown in FIG. 3 and FIG. 5, the slit portion 21c includes a treated layer 24 that is subjected to a surface treatment at the longitudinally opposite ends thereof. The treated layer 24 preferably has a surface energy which is lower than that of the surface of the longitudinally central portion of the slit portion 21c by 10 mN/m to 30 mN/m. That is, (the surface energy of surface of the longitudinally central portion of the slit portion 21c)−(the surface energy of the treated layer 24) is preferably 10 mN/m to 30 mN/m. When the surface energy of the treated layer 24 is excessively lower than that of the surface of the longitudinally central portion of the slit portion 21c, the treated layer 24 tends to exhibit excessively high liquid repellency and smoothness, hindering the flow of the dope. When the surface energy of the treated layer 24 is not substantially lower than that of the surface of the longitudinally central portion of the slit portion 21c, the above-described relations for the discharge velocity are not met. This tends to preclude the effects of the present invention from being sufficiently exerted. Hence, when a resin film is produced using a casting die obtained such that the surface energy of the treated layer 24 meets the above-described relations, the resin film produced is further restrained from becoming defective at the ends thereof.

Furthermore, in this case, the surface energy can be measured by a well-known method. Specifically, the respective contact angles of a plurality of types of liquids for which surface free energy and the components thereof (a dispersion force component, a polarity component, and a hydrogen binding component) are known are measured, and then, the surface energy can be calculated based on the plurality of contact angles measured.

More specifically, the measurement can be carried out as follows.

First, the surface energy of a liquid has a dispersion force component, a polarity component, and a hydrogen binding component as shown in:

$$\gamma_L = \gamma_L^d + \gamma_L^p + \gamma_L^h \quad (a).$$

In the expression, $\gamma$ denotes surface energy, $\gamma^d$ denotes the dispersive component of the surface energy, $\gamma^p$ denotes the polarity component of the surface energy, and $\gamma^h$ denotes the hydrogen binding component of the surface energy. The subscript L added to each $\gamma$ denotes a liquid.

The liquid may have only a dispersive component, have both a dispersive component and a polarity component but no hydrogen binding component, or have both a dispersive component and a hydrogen binding component but no polarity component depending on the type thereof. All the components may be known components.

Specifically, for n-hexadecane, $\gamma_L^d$ is 27.6 mN/m both $\gamma$Yhd L$^p$ and $\gamma_L^h$ are 0 mN/m. For methylene iodide. $\gamma_L^d$ is 46.8 mN/m, $\gamma_L^p$ is 4 mN/m, and $\gamma_L^h$ is 0 mN/m. For water, $\gamma_L^d$ is 29.1 mN/m, $\gamma_L^p$ is 1.3 mN/m, and $\gamma_L^h$ is 42.4 mN/m. For ethylene glycol, $\gamma_L^d$ is 30.1 mN/m, $\gamma_L^p$ is 0 mN/m, and $\gamma_L^h$ is 17.6 mN/m.

That is, n-hexadecane has only a dispersive component. Methylene iodide has both a dispersive component and a polarity component but no hydrogen binding component. Water has all of the three components. Ethylene glycol has both a dispersive component and a hydrogen binding component but no polarity component.

First, 3 mm³ of n-hexadecane, having only a dispersive component, was dropped, and a static contact angle was measured using a contact angle gauge (trade name PG-X produced by MATSUBO Corporation). At intervals of 10 mm in the width direction of a disassembled dice over the range of 300 mm from a widthwise end of the dice, the contact angle was measured at three points, that is, at each position and the vicinities thereof, and the measured values were averaged. The contact angle obtained can be used to calculate the dispersive component $\gamma_S^d$ of the surface energy of the dice, which is a measurement target, in accordance with:

$$Wa = \gamma_L(1 + \cos\theta) \text{(Young-Dupre's equation)} \quad (b); \text{ and}$$

$$Wa = 2(\gamma_S^d \gamma_L^d)^{1/2} + 2(\gamma_S^p \gamma_L^p)^{1/2} + 2(\gamma_S^h \gamma_L^h)^{1/2} \quad (c).$$

The subscript S added to each $\gamma$ denotes a solid, and Wa denotes work of adhesion.

Subsequently, for methylene iodide, having both a dispersive component and a polarity component and no hydrogen binding component, the contact angle is measured by a method similar to the above-described method. Then, the polarity component $\gamma_S^p$ of the surface energy of the dice, which is a measurement target, can be calculated in accordance with Expression (b) and Expression (c) described above, using the contact angle obtained and a previously calculated dispersive component $\gamma_S^d$.

Moreover, for water, having all of the three components, the contact angle is measured by a method similar to the above-described method. Then, the hydrogen binding component $\gamma_S^h$ of the surface energy of the dice, which is a measurement target, can be calculated in accordance with Expression (b) and Expression (c) described above, using the obtained contact angle, and the previously calculated dispersive component $\gamma_S^d$ and polarity component $\gamma_S^p$.

Then, using the dispersive component $\gamma_S^d$, polarity component $\gamma_S^p$, and hydrogen binding component $\gamma_S^h$ calculated by the above-described method, the surface energy $\gamma_S$ of the dice, which is a measurement target, can be calculated in accordance:

$$\gamma_S = \gamma_S^d + \gamma_S^p + \gamma_S^h \quad (d).$$

For example, the surface energy $\gamma_S$ of the casting die surface can be calculated as described above.

Furthermore, the width D of the treated layer 24, that is, the length D of the treated layer 24 in a direction parallel to the longitudinal direction of the discharge port 21b, is not particularly limited provided that the above-described relations for the dope discharge velocity are met. Specifically, preferably, the width D is, for example, 30 mm to 300 mm. When the width D of the treated layer 24 is excessively short, the above-described relations for the discharge velocity fail to be met. This tends to preclude the effects of the present invention from being sufficiently exerted. When the width D of the treated layer 24 is excessively long, the treated layer 24 exhibits high liquid repellency and smoothness over an excessively large area. This tends to hinder the flow of the dope.

Furthermore, the length E of the treated layer 24 in a direction orthogonal to the longitudinal direction of the discharge port 21b is not particularly limited provided that the above-described relations for the dope discharge velocity are met. Specifically, preferably, the length E is, for example, 50 mm to 300 mm, though the length E depends on the longitudinal length of the discharge port 21b. When the length E of the treated layer 24 is excessively short, the above-described relations for the discharge velocity fail to be met. This tends to preclude the effects of the present invention from being sufficiently exerted. When the length E of the treated layer 24 is excessively long, the treated layer 24 exhibits high liquid repellency and smoothness over an excessively large area. This tends to hinder the flow of the dope.

If the dope feeding pipe 22 branches into a plurality of pipes, a center distance (pitch) F between the adjacent branches of the dope feeding pipe 22 at a position where the dope feeding pipe 22 is connected to the casting die main body 21 is preferably set equal to about 10% to 25% of the width (the width of the casting ribbon) B of the discharge port 21b in view of stable supply of the dope 16. Furthermore, the center distance (pitch) F between the adjacent branches of the dope feeding pipe 22 at the position where the dope feeding pipe 22 is connected to the casting die main body 21 is equivalent for all the branches of the dope feeding pipe 22.

Furthermore, after branching, the dope feeding pipe 22 is preferably bent smoothly instead of being bent at a right angle or being sharply bent, for example, at a small radius of curvature, as shown in FIG. 2 and FIG. 3. When the dope feeding pipe 22 is sharply bent, the flow of the dope stagnates, and the dope tends to be likely to be contaminated.

Additionally, the width (slit width) G of the slit portion 21c can be adjusted according to the thickness of a resin film to be produced. The width G is preferably adjusted to between about 100 μm and 1,000 μm. When the slit width G is excessively small, a liquid delivery pressure of the dope 16 increases. Furthermore, if the dope 16 is mixed with fine foreign matter, the foreign matter may be caught in slit portion 21c, and the cast membrane may be subjected to streak-shaped damage. When the slit width G is excessively large, producing a thin resin film tends to be difficult.

In addition, the length H of the slit portion 21c, that is, the distance H between a lower end of the manifold portion 21a and the discharge port 21b, is preferably about 100 times to 400 times the slit width G. That is, H/G is preferably between about 100 and 400. When the H/G is excessively small, a time required for the dope 16 to pass through the slit portion 21c is excessively short. This tends to make the control of the amount of the discharged dope 16 (casting amount) difficult. When the H/G is excessively large, the time required for the dope 16 to pass through the slit portion 21c is excessively long. This tends to cause the dope to be contaminated.

Furthermore, the velocity of the dope discharged from the casting die 20 is not particularly limited provided that the velocity of the dope discharged from the opposite ends and the velocity of the dope discharged from the central portion meet the above-described relations. Preferably, the velocity of the dope discharged from the opposite ends is, for example, 75 m/min to 150 m/min. Preferably, the velocity of the dope discharged from the central portion is, for example, 50 m/min to 100 m/min.

Additionally, the casting die 20 is not limited to the shape shown in FIGS. 2 to 5 provided that the discharge velocity meets the above-described relations.

In addition, the casting die 20 is subjected to a hydrophobic treatment as a surface treatment at the longitudinally opposite ends of the slit portion, through which the resin solution passes. However, provided that the discharge velocity meets the above-described relations, the casting die 20 may be subjected to a hydrophilic treatment as a surface treatment in the longitudinally central portion of the slit portion, through which the resin solution passes.

Then, a resin film can be produced by using the releasing roller 13, the drying device 14, the winding device 15, and the like to carry out a releasing step and a drying step on the cast membrane (web) formed on the endless belt support 11. Steps described below are not particularly limited, and any common steps may be adopted. Specifically, for example, the following steps may be used. The present invention is not limited to the following steps.

First, the cast membrane formed (web) is conveyed on the endless belt support 11, with the solvent in the dope dried. The drying is carried out by, for example, heating the endless belt support 11 or blowing heated air against the web. At this time, the temperature of the web is preferably set to −5° C. to 70° C. and more preferably 0° C. to 60° C. taking into account a conveying speed associated with a time required to evaporate the solvent, the degree of dispersion of particulates, productivity, and the like, though the temperature also depends on the dope solution. The web temperature is preferably high because the speed at which the solvent is dried increases consistently with the web temperature. However, an excessively high web temperature tends to cause the solvent to be bubbled or to degrade the planarity of the web.

Examples of a method for heating the endless belt support 11 include, for example, heating the web on the endless belt support 11 by an infrared heater, heating a front surface and a back surface of the endless belt support 11 by the infrared heater, and heating the back surface of the endless belt support 11 by blowing heated air against the back surface. Any of these methods may be selected as appropriate.

Furthermore, if heated air is blown against the endless belt support 11, the wind pressure of the heated air is preferably set to 50 Pa to 5,000 Pa, taking the uniformity of solvent evaporation and the degree of dispersion of particulates into account. During the drying, the temperature of the heated air may be maintained constant or varied among several levels of temperatures in the running direction of the endless belt support 11.

A time from the casting of the dope onto the endless belt support 11 until the web is released from the endless belt support 11 is preferably set within the range of 0.5 minutes to minutes taking into account the ability to release the web from the endless belt support 11, though the time also depends on the film thickness of the resin film to be produced and the solvent used.

Preferably, the running speed of the endless belt support 11 is, for example, about 60 m/min to 150 m/min. This allows efficient production of a resin film restrained from becoming defective at the ends thereof. Thus, when the endless belt support 11 runs at a relatively high speed, the resin film can be efficiently produced but generally tends to be likely to become defective at the ends thereof. However, the method for producing a resin film according to the present embodiment enables an increase in production efficiency, while restraining the resin film from becoming defective at the ends thereof.

Furthermore, the ratio (draft ratio) of the running speed of the endless belt support 11 to the flow velocity of the dope discharged from the casting die 20 is preferably about 0.5 to 2. When the draft ratio falls within this range, a cast membrane can be stably formed. For example, an excessively high draft ratio tends to cause a neck-in phenomenon in which the cast membrane is contracted in the width direction thereof. This precludes formation of a wide resin film.

The releasing roller 13 is disposed close to the surface of the endless belt support 11 on which the dope 16 is cast. The distance between the endless belt support 11 and the releasing roller 13 is preferably 1 mm to 100 mm. The dried cast membrane (web) is pulled under tension using the releasing roller 13 as a supporting point. Thus, the dried cast membrane (web) is released to obtain a film. When the film is released from the endless belt support 11, the film is stretched in the film conveying direction (machine direction: MD direction) under a releasing tension and the subsequent conveying tension. Thus, the releasing tension and conveying tension exerted when the film is released from the endless belt support 11 are preferably set to 50 N/m to 400 N/m.

Furthermore, a residual solvent rate obtained when the film is released from the endless belt support 11 is preferably set to 30 mass % to 200 mass %, taking into account the ability to release the film from the endless belt support 11, the residual solvent rate measured during the release, the ability to convey the film after the release, the physical properties of the resin film resulting from conveyance and drying, and the like. The residual solvent rate is defined by:

$$\text{Residual solvent rate (mass \%)} = \{(M_1 - M_2)/M_2\} \times 100 \qquad (I).$$

Here, $M_1$ denotes the mass of the film measured at any point of time, and $M_2$ denotes the mass of the film dried at 115° C. for one hour, with the mass $M_1$ of the film already measured.

The drying device 14 includes a plurality of conveying rollers. The film is dried by being conveyed between the rollers. During the conveyance, the film may be dried by using one of heated air, infrared light, and the like or using both heated air and infrared light. The heated air is preferably used in view of convenience. A drying temperature may be selected from the range of 30° C. to 180° C. as appropriate based on the residual solvent rate, taking the time required for drying, contraction unevenness, the stability of the amount of expansion and contraction, and the like into account, though the preferred temperature depends on the amount of residual solvent. Furthermore, the film may be dried at a constant temperature or at several levels of temperatures, that is, two to four levels of temperatures into which the range of temperatures is divided. Additionally, while being conveyed through the drying device 14, the film can be stretched in the MD direction.

The residual solvent rate of the film resulting from the drying process in the drying device 14 is preferably set to 0.001 mass % to 5 mass %, taking loads during the drying step, the dimensional stability and the ratio of expansion and contraction during storage, and the like into account. According to the present embodiment, the resin film refers to a film from which the solvent is gradually removed during the drying step, so that the total amount of residual solvent is 15 mass % or less.

The winding device 15 allows the resin film with the residual solvent rate set to a predetermined value by the drying device 14 to be wound around a winding core. During the winding, the temperature is preferably reduced to room temperature in order to prevent possible scratches, loose winding, and the like which are caused by contraction of the film after the winding. A winder used is not particularly limited but may be a common winder. Specifically, a winder to which a constant tension method, a constant torque method, a tapered tension method, a programmed tension control method with a constant internal stress, or the like is applied may be used for the winding.

The device for producing a resin film is not limited to the above-described configuration, and may include, for example, a separate stretching device. The stretching device may, for example, stretch the film released from the endless belt support 11 in a direction orthogonal to the film conveying direction (traverse direction: TD).

The composition of the resin solution (dope) for use in the present embodiment will be described.

The resin solution for use in the present embodiment is a transparent resin dissolved into a solvent.

The transparent resin may exhibit transparency when shaped like a substrate by the solution cast film-forming method or the like and is not particularly limited. However, preferably, for example, the transparent resin can be easily produced by the solution cast film-forming method or the like, can be bonded well to another functional layer such as a hard coat layer, and is optically isotropic. The transparency as used herein means that the transparent resin allows 60% or more, preferably 80% or more, and more preferably 90% or more of visible light to pass through.

Specifically, particularly preferred examples of the transparent resin include cellulose ester resins such as a cellulose diacetate resin, a cellulose triacetate resin, a cellulose acetate butyrate resin, and a cellulose acetate propionate resin; polyester resins such as a polyethylene terephthalate resin and a polyethylene naphthalate resin; an acrylic resin such as a polymethyl methacrylate resin; vinyl resins such as a polysulfone (including polyether sulfone) resin, a polyethylene resin, a polypropylene resin, cellophane, a polyvinylidene chloride resin, a polyvinyl alcohol resin, an ethylene vinyl alcohol resin, a syndiotactic polystyrene resin, a cycloolefin resin, and a polymethyl pentene resin; a polycarbonate resin; a polyarylate resin; a polyether ketone resin; a polyether ketone imide resin; a polyamide resin; and a fluorine resin. Among these resins, the cellulose ester resins, the cycloolefinin resin, the polycarbonate resin, and the polysulfone (including polyether sulfone) resin are preferred. Moreover, the cellulose ester resins are preferred, and among the cellulose ester resins, the cellulose acetate resin, the cellulose propionate resin, the cellulose butyrate resin, the cellulose acetate butyrate resin, the cellulose acetate propionate resin, and the cellulose triacetate resin are preferred. The cellulose triacetate resin is particularly preferred. Furthermore, each of the illustrated transparent resins may be independently used or two or more of the illustrated transparent resins may be combined together.

Now, the cellulose ester resin will be described.

The cellulose ester resin preferably has a number average molecular weight of 30,000 to 200,000 in order to offer a high mechanical strength when the resin is formed into a resin film and to offer an appropriate dope viscosity for the solution cast film-forming method. Furthermore, the cellulose ester resin preferably has a weight average molecular weight (Mw)/number average molecular weight (Mn) between 1 and 5 and more preferably between 1.4 and 3.0.

Furthermore, the average molecular weight and molecular weight distribution of the resin such as the cellulose ester resin can be measured using gel permeation chromatography or high-speed liquid chromatography. Hence, the average molecular weight and the molecular weight distribution can be used to calculate the number average molecular weight (Mn) and the weight average molecular weight (Mw), and the ratio between the number average molecular weight (Mn) and the weight average molecular weight (Mw) can be calculated.

The cellulose ester resin preferably has an acyl group with a carbon number of 2 to 4 as a substituent group. For example, when the acyl group is defined to have substitution degree X for an acetyl group and a substitution degree Y for a propionyl group or a butyryl group, preferably the sum of X and Y is 2.2 or more and 2.95 or less, and X is larger than 0 and equal to or smaller than 2.95.

Furthermore, a portion of the cellulose ester resin which has not been substituted with the acyl group is normally present as a hydroxyl group. The cellulose ester resins can be synthesized by a well-known method. The substation degree of the acyl group can be measured in conformity with the provision in ASTM-D817-96.

Cellulose, which is a material for the cellulose ester resin, is not particularly limited. Examples of the cellulose include cotton linter, wood pulp (obtained from needle-leaved trees or broad-leaved trees), and Kenaf. Furthermore, cellulose ester resins obtained from these materials may be blended together in any ratio. However, 50 mass % or more cotton linter is preferably used. If an acylating agent is an acid anhydride (acetic anhydride, propionic anhydride, or butyric anhydride), these cellulose ester resins can be obtained by reaction with the cellulose material using an organic acid such as acetic acid or an organic solvent such as methylene chloride as well as a proton catalyst such as sulfuric acid.

The solvent for use in the present embodiment may contain a good solvent for the above-described transparent resins. The good solvent used depends on the transparent resin used. For example, in the case of the cellulose ester resin, whether the solvent is good or poor is determined depending on the acyl group substation degree of the cellulose ester. For example, when acetone is used as a solvent, the solvent is good for cellulose acetate propionate, which is an ester acetate of the cellulose ester (a substation degree of 2. 4 for the acetyl group) and is poor for the ester acetate of the cellulose (a substation degree of 2. 8 for the acetyl group). Thus, since whether a solvent is good or poor is determined depending on the transparent resin used, a case of the cellulose ester resin will be described by way of example.

Examples of the good solvent for the cellulose ester resin include an organic halogen compound such as methylene chloride, methyl acetate, ethyl acetate, amyl acetate, acetone, tetrahydrofuran, 1,3-dioxolane, 1,4-dioxolane, a dioxolane derivative, cyclohexane, ethyl formate, 2,2,2-trifluoroethanol, 2,2,3,3-tetrafluoro 1-propanol, 1, 3-difluoro-2propanol, 1,1,1,3,3,3-hexafluoro-2-methyl-2-propanol, 1,1,1,3,3, 3-hexafluoro-2-propanol, 2,2,3,3,3-pentafluoro-1-propanol, and nitroethane. Among these solvents, the organic halogen compound such as methylene chloride, the dioxolane derivative, methyl acetate, ethyl acetate, acetone, and the like are preferred. Each of these good solvents may be independently used, or two or more of the good solvents may be combined together.

Furthermore, the dope may contain a poor solvent to the extent that the transparent resin is prevented from being precipitated. Examples of the poor solvent for the cellulose ester resin include alcohols with 1 to 8 carbon atoms such as methanol, ethanol, n-propanol, iso-propanol, n-butanol, sec-butanol, and tert-butanol, methyl ethyl ketone, methyl isobutyl ketone, propyl acetate, monochlorobenzene, benzene, cyclohexane, tetrahydrofuran, methyl cellosolve, and ethylene glycol monomethyl ether. Each of these poor solvents may be independently used, or two or more of the poor solvents may be combined together.

Additionally, the resin solution for use in the present embodiment may contain any component (additive) different from the above-described transparent resins and solvents to the extent that the effects of the present invention are prevented from being hindered. Examples of the additive include particulates, a plasticizer, an antioxidant, an ultraviolet absorber, a heat stabilizer, a conductive substance, a flame retardant, a glidant, and a matting agent.

The particulates are selected as appropriate according to an intended purpose. Specifically, the intended purpose is, for example, to scatter visible light or provide a slippage property to the transparent resin by containing the particulates in the transparent resin. When the transparent resin contains the particulates, both the scattering of visible light and the improvement of the slippage property can be achieved. Furthermore, for either intended purpose, the particle size of the particulates and the content of particles need to be adjusted to the extent that the transparency of the film is prevented from being impaired. The particulates may be inorganic particulates such as silicon oxide or organic particulates such as acrylic resin.

Examples of the inorganic particulates include particulates of silicon oxide, titanium oxide, aluminum oxide, zirconium oxide, magnesium oxide, calcium carbonate, strontium carbonate, talc, clay, calcined kaolin, calcined calcium silicate, hydrated calcium silicate, aluminum silicate, magnesium silicate, and calcium phosphate. Among these particulates, particulates of silicon oxide, titanium oxide, aluminum oxide, zirconium oxide, magnesium oxide, and the like are preferably used.

Furthermore, examples of the organic particles include particles of an acrylic resin such as a polymethyl methacrylate resin, and an acryl styrene resin, a silicone resin, a polystyrene resin, a polycarbonate resin, a benzoganamin resin, a melamine resin, a polyolefin resin, a polyester resin, a polyamide resin, a polyimide resin, and a polyfluoroethylene resin. Among these particulates, for example, acrylic resin particulates of cross-linked polystyrene particles and polymethyl methacrylate particles are preferred.

Furthermore, each of the above-described types of particulates may be independently used or two or more of these types of particulates may be combined together.

The particulates preferably have an average particle size of 0.1 μm to 10 μm and more preferably 0.3 μm to 5 μm. Particulates having an excessively small average particle size tend to fail to sufficiently provide the functions thereof. Furthermore, particulates having an excessively large average particle size tend not only to fail to sufficiently provide the functions thereof but also to degrade the translucency of the resin film. The average particle size of the particulates can be measured by observing a cross section of the resin film with a TEM but may be measured using a laser diffraction particle size distribution analyzer.

The content of particulates is preferably 0.01 mass % to 35 mass % and more preferably 0.05 mass % to 30 mass % of the transparent resin. An excessively small particulate content prevent the functions of the particulates from being sufficiently provided. Furthermore, an excessively large particulate content tends to degrade the translucency of the resin film.

Furthermore, the shape of the particulates is not particularly limited. Examples of the shape include a sphere, a plate, and a needle shape. The sphere is preferred.

The plasticizer may be used without any particular limitation. Examples of the plasticizer include a phosphate plasticizer, a phthalate plasticizer, a trimellitate plasticizer, a pyromellitic plasticizer, a glycolate plasticizer, a citrate plasticizer, and a polyester plasticizer. When the transparent resin contains the plasticizer, the content of the plasticizer is preferably set to 1 mass % to 40 mass %, more preferably 3 mass % to 20 mass %, and much more preferably 4 mass % to 15 mass % of the cellulose ester resin taking dimensional stability and workability into account. An excessively small plasticizer content may preclude smooth cut surfaces of the transparent resin from being obtained during slitting or punching. This tends to generate a large amount of chips. That is, the effect of containing the plasticizer in the transparent resin cannot be sufficiently exerted.

The antioxidant may be used without any particular limitation. For example, a hindered phenol compound is preferably used. Furthermore, if the transparent resin contains the antioxidant, the content of the antioxidant in terms of percentage by mass is preferably 1 ppm to 1.0% and more preferably 10 ppm to 1,000 ppm of the cellulose ester resin.

The resin film produced by the producing method according to the present embodiment can be used for a polarizing plate, a liquid crystal display member, or the like owing to the high dimensional stability thereof. In this case, an ultraviolet absorber is preferably used to prevent the polarizing plate, the liquid crystal, or the like from being degraded.

A preferred ultraviolet absorber is excellent in absorbing ultraviolet light with a wavelength of 370 nm or less, and absorbs a reduced amount of visible light with a wavelength of 400 nm or more so as to provide appropriate liquid crystal display performance. Specifically, the ultraviolet absorber preferably allows less than 10% and particularly preferably less than 5% of light with a wavelength of 380 nm to pass through. Specifically, examples of the ultraviolet absorber include an oxobenzophenone compound, a benzotriazole compound (benzotriazole ultraviolet absorber), a salicylate compound, a benzophenone compound (benzophenone ultraviolet absorber), a cyanoacrylate compound, a nickel complex salt compound, and a triazine compound. Among these ultraviolet absorbers, the benzotriazole ultraviolet absorber and the benzophenone ultraviolet absorber are preferred. The content of the ultraviolet absorber is preferably set to 0.1 mass % to 2.5 mass % and more preferably 0.8 mass % to 2.0 mass % taking the effects of the ultraviolet absorber, transparency, and the like into account.

Examples of the heat stabilizer include inorganic particulates such as kaolin, talc, diatomite, quartz, calcium carbonate, barium sulfate, titanium oxide, and alumina, and salts of alkali earth metal such as calcium and magnesium.

The conductive substance is not particularly limited. Examples of the conductive substance include ion conductive substances such as an anionic polymer compound, conductive particulates such as particulates of metallic oxide, and an antistatic agent. When the transparent resin contains the conductive substance, a resin film with a preferred impedance can be obtained. Here, the ion conductive substance refers to a substance exhibiting electric conductivity and containing ions that are carriers for electricity.

The dope preferably has a viscosity of 30 Pa·s to 80 Pa·s as measured at 30° C. using a rotational viscometer. This enables efficient production of a resin film restrained from becoming defective at the ends thereof. The use of such dope with a relatively high viscosity allows a resin film to be efficiently produced but generally tends to be likely to make the film defective at the ends thereof. However, the method for producing a resin film according to the present embodiment can improve the production efficiency while restraining the resin film from becoming defective at the ends thereof. The viscosity as used herein is not particularly limited provided that the viscosity is measured at 30° C. using a rotational viscosimeter. Specifically, for example, the viscosity is measured as follows. First, the dope flowing through the dope feeding pipe 22 in the casting die 20 is drawn into a closed container for containment. Then, a spindle of a rotational viscosimeter (B type viscometer) produced by Brookfield Engineering Laboratories, Inc. is inserted into the dope in the closed container and rotated at a shear velocity of 0.5 (1/s) to obtain a value.

Now, an example of a method for preparing dope will be described in which a cellulose ester resin is used as a transparent resin.

A method for dissolving a cellulose ester resin during preparation of dope is not particularly limited, and any common method may be used. A preferred method is as follows. A combination of heating and pressurization enables heating up to a temperature equal to or higher than the boiling point of a solvent at normal pressure. This is utilized to allow the cellulose ester resin to be dissolved into the solvent at a temperature equal to or higher than the boiling point of the solvent at normal pressure. This method is preferred in that the method prevents generation of gel or a massive undissolved substance called "mamako" (lump). A method is also preferably used in which the cellulose ester resin is blended with a poor solvent and thus wetted or swollen and in which a good solvent is added to the cellulose ester resin to dissolve the cellulose ester resin.

The pressurization may be carried out by a method of feeding inert gas such as nitrogen gas under pressure or heating the solvent in the closed container to raise the vapor pressure of the solvent. This heating is preferably externally carried out, and for example, a container of a jacket type is preferred because the temperature of the container can be easily controlled.

The temperature (heating temperature) of the solvent used when the cellulose ester resin is dissolved is preferably high because a high temperature allows facilitates the dissolution of the cellulose ester resin. However, increasing the heating temperature requires an increase in the pressure in the container by the above-described pressurization, thus degrading productivity. Hence, the heating temperature is preferably 45° C. to 120° C. Furthermore, the pressure is adjusted to a value such that the solvent is prevented from being boiled at the set temperature. Alternatively, a cooling dissolution method is preferably used and allows the cellulose ester resin to be dissolved into a solvent such as methyl acetate.

Then, the obtained solution of the cellulose ester resin is filtered using an appropriate filter medium such as filter paper. The filter medium preferably has a low absolute filter rating so as to remove insoluble substances and the like. However, an excessively low absolute filter rating is disadvantageously likely to cause the filter medium to be clogged. Thus, the filter medium preferably has an absolute filter rating of 0.008 mm or less and more preferably 0.001 mm to 0.008 mm.

The material of the filter medium is not particularly limited, and any ordinary filter medium may be used. For example, the following filter medium is preferred because the filter medium is free from coming-off of fiber and the like: a filter medium formed of plastic such as polypropylene or Teflon (registered trademark), filter paper formed of cellulose fiber or rayon, or a filter medium formed of metal such as stainless steel. The filtration preferably allows impurities, particularly, bright-spot foreign matter contained in the solution of the cellulose ester resin, which is a material, to be removed and reduced. The bright-spot foreign matter is as follows. Two polarizing plates are disposed in a crossed Nichol state, with a resin film interposed between the plates. One of the polarizing plates is lighted from a first side, and an observer views the other polarizing plate from a second side opposite to the first side. Then, the observer views gleam of light from the first side. These spots (foreign matter) where the light is visible are referred to as the bright-spot foreign matter. Preferably, 200 or less bright spots each with a diameter of 0.01 mm or more are present per $cm^2$.

The filtration is not particularly limited and can be carried by a normal method. A preferred method is to carry out filtration while heating the solvent within the range of temperatures which are equal to or higher than the boiling point of the solvent at normal pressure and at which the solvent is prevented from being boiled under pressure. This method is preferred because the method suppresses an increase in the difference between the filter pressure before the filtration and the filter pressure after the filtration (the difference is referred to as a differential pressure). The above-described temperature is preferably 35° C. to 60° C. The level of the filtration is preferably low, for example, 1.6 MPa or less.

If the above-described additive is contained in the resin film, then for example, the additive may be dissolved into an organic solvent such as alcohol, methylene chloride, or dioxolane before the resultant solvent is added to the dope or may be added directly into a dope composition. Furthermore, for inorganic powder or the like which is not dissolved into an organic solvent, preferably a dissolver or a sand mill is used to disperse the additive into the cellulose ester resin and the resultant dispersion liquid is added to the dope.

The particulates are dispersed into the obtained solution of the cellulose ester resin. A method for dispersing the particulates is not particularly limited and can be carried out, for example, as follows. For example, first, a dispersion solvent and the particulates are stirred and mixed and then dispersed using a disperser. A particulate dispersion liquid is obtained. The particulate dispersion liquid is added to the above-described solution of the cellulose ester resin, which is then stirred.

Examples of the dispersion solvent include lower alcohols such as methyl alcohol, ethyl alcohol, propyl alcohol, isopropyl alcohol, and butyl alcohol. The dispersion solvent is not particularly limited to the lower alcohols. A solvent is preferably used which is similar to the solvent used to prepare the solution of the cellulose ester resin.

The disperser used is not particularly limited, and a common disperser may be used. The disperser is roughly classified into a media type and a media-less type. The media-less disperser is preferred due to the reduced haze thereof (increased translucency). Examples of the media-less disperser include a ball mill, a sand mill, and a dino mill. Furthermore, the media-less disperser is classified into an ultrasonic type, a centrifugal type, and a high-pressure type, and the high-pressure disperser is preferred. The high-pressure disperser is an apparatus that mixes the particulates and a solvent to obtain a composition and to pass the composition through a small tube to generate a special condition such as a high shear condition or a high-pressure condition. Examples of the high-pressure disperser include an ultrahigh-pressure homogenizer produced by Microfluidics Corporation (trade name: Microfluidizer), a nanomizer produced by NANOMIZER Inc., and a Manton Gorlin high-pressure disperser. Examples of the Manton Gorlin high-pressure disperser include a homogenizer produced by IZUMI FOOD MACHINERY Co., Ltd. and UHN-01 produced by SANWA MACHINERY TRADING CO., LTD.

Furthermore, the solvent flowing from the opposite ends of the discharge port in the casting die may be similar to the solvent for the resin solution (dope). Specifically, the solvent may contain a good solvent for the transparent resin and may contain a poor solvent as appropriate.

The producing method according to the present embodiment as described above provides a resin film restrained from becoming defective at the ends thereof as a result of the entrainment of the dope or the vibration of the support. Furthermore, even when a wide resin film is produced, the producing method according to the present embodiment can restrain the resin film from becoming defective at the ends thereof. Thus, a resin film is obtained which is applicable to a liquid crystal display device with a larger screen.

Furthermore, the width of the resin film obtained is preferably set to 1,500 mm to 3,000 mm taking into account the use of the resin film in a large-sized liquid crystal display device, the use efficiency of the film for processing into a polarizing plate, and production efficiency. Such a wide resin film generally tends to be defective at the ends thereof. However, the method for producing a resin film according to the present embodiment can provide a resin film restrained from becoming defective at the ends thereof.

Furthermore, the film thickness of the resin film is preferably set to 20 μm to 70 μm in view of reduced thickness of the liquid crystal display device and stabilized production of resin films. The film thickness as used herein refers to the average film thickness. A contact thickness gauge produced by Mitsutoyo Corporation is used to measure the film thickness of the resin film at 20 points to 200 points in the width direction thereof. The measured values are averaged to determine the film thickness.

(Polarizing Plate)

The polarizing plate according to the present embodiment includes a polarizing element and a transparent protective film disposed on a surface of the polarizing element. The transparent protective film is the above-described resin film. The polarizing element is an optical element that converts incident light into polarized light and emits the polarized light.

The polarizing plate preferably includes a polarizing element produced by immersing a polyvinyl alcohol film into an iodine solution and then stretching the film, and the above-described resin film or laminated film stuck to at least one surface of the polarizing element using a completely saponified water solution of polyvinyl alcohol. Alternatively, the resin film may be laminated on another surface of the polarizing element, or a transparent protective film for another polarizing plate may be laminated on the polarizing element. Preferred examples of the transparent protective film for the polarizing plate include commercially available cellulose ester films such as KC8UX2M, KC4UX, KC5UX, KC4UY, KC8UY, KC12UR, KC8UY-HA, and KC8UX-RHA (all of these films are produced by Konica Minolta Optics, Inc.). Alternatively, a resin film other than the cellulose ester film such as a cyclic olefin resin, an acrylic resin, polyester, and polycarbonate may be used. Such a resin film has low saponification compatibility and is thus preferably bonded to the polarizing plate via an appropriate adhesive.

As described above, the polarizing plate uses the resin film as a protective film laminated on at least one surface of the polarizing element. In this case, if the resin film functions as a phase difference film, a slow axis of the resin film is preferably disposed substantially parallel or orthogonally to an absorption axis of the resin film.

Furthermore, a specific example of the polarizing element is a polyvinyl alcohol polarizing film. One type of polyvinyl alcohol polarizing film is a polyvinyl alcohol film dyed with iodine, and another type of polyvinyl alcohol polarizing film is a polyvinyl alcohol film dyed with a dichroic dye. As this polyvinyl alcohol film, a modified polyvinyl alcohol film modified with ethylene is preferably used.

The polarizing element is obtained, for example, as follows. First, a water solution of polyvinyl alcohol is used to produce a film. The polyvinyl alcohol film obtained is uniaxially stretched and then dyed or dyed and then uniaxially stretched. Then, the film is preferably subjected to a durability treatment using a boron compound.

The polarizing element is preferably 5 μm to 40 μm, more preferably 5 μm to 30 μm, and most preferably 5 μm to 20 μm in film thickness.

If a cellulose ester resin film is laminated on a surface of the polarizing element, the lamination is preferably carried out using an aqueous adhesive containing completely saponified polyvinyl alcohol or the like as a main component. Furthermore, if the resin film is other than the cellulose ester resin film, the resin film is preferably bonded to the polarizing plate via an appropriate viscous layer.

The above-described polarizing plate uses the resin film according to the present embodiment as a transparent protective film. Since the resin film is restrained from becoming defective at the ends thereof, application of the obtained polarizing plate to, for example, a liquid crystal display device can improve the quality of images formed by the liquid crystal display device, for example, the contrast of the images. Moreover, if a wide resin film is used as a transparent protective film for a polarizing element, the polarizing plate is applicable to a liquid crystal display device with a larger screen.

(Liquid Crystal Display Device)

A liquid crystal display device according to the present embodiment includes a liquid crystal cell and two polarizing plates arranged so as to sandwich the liquid crystal cell therebetween. At least one of the two polarizing plates is the above-described polarizing plate. The liquid crystal cell refers to a pair of electrodes between which a liquid crystal substance is filled. Application of a voltage to the electrodes changes the orientation state of the liquid crystal, thus controlling the amount of light transmitted. Such a liquid crystal display device uses the above-described polarizing plate as a transparent protective film for a polarizing plate. Hence, a liquid crystal display device is obtained which provides improved image quality, that is, improved contrast or the like. Moreover, if a wide resin film is used as a transparent protective film for a polarizing plate, a screen of the liquid crystal display device can be increased in size.

EXAMPLES

The present invention will be specifically described below with reference to examples. However, the present invention is not limited to these examples.

Example 1

(Preparation of the Dope)

First, 100 parts by mass cellulose triacetate resin (number average molecular weight Mn: 148,000, weight average molecular weight Mw: 310,000, Mw/Mn=2.1) as a transparent resin was added into a solution tank containing 440 parts by mass methylene chloride and 40 parts by mass ethanol, and 8 parts by mass triphenyl phosphate, 2 parts by mass ethylphthalyl ethylglycol, 0.5 parts by mass TINUVIN 109 (produced by BASF Japan Ltd.), 0.5 parts by mass TINUVIN 171 (produced by BASF Japan Ltd.), and 0.2 parts by mass AEROSIL 972V (produced by Nippon Aerosil Co., Ltd.) were further added into the tank. Then, the temperature of the liquid in the tank was increased up to 80° C., and the liquid was stirred for three hours. Thus, a resin solution was obtained. Subsequently, the stirring was ended, and the solution was left untreated until the temperature decreased down to 43° C. After being left untreated, the resin solution was filtered using filter paper with a filtration accuracy of 0.005 mm. After the filtration, the resin solution was left untreated overnight to degas the resin solution. The resultant resin solution was used as dope to produce a resin film as described below.

(Production of a Resin Film)

First, the temperature of the dope obtained was adjusted to 30° C., and the temperature of an endless belt support was adjusted to 25° C. Then, such a device for producing a resin film as shown in FIG. 1 was used to cast the dope conveyed at a speed of 100 m/min, from a casting die onto the endless belt support, including an endless belt formed of stainless steel and polished into a super mirror surface.

The casting die used included a treated layer formed at the longitudinally opposite ends of a slit portion and plated using ultra chrome produced by Extrusion Die Industries (EDI). The width D of the treated layer is as shown in Table 1. Furthermore, the surface energy of the treated layer is lower than the surface energy of the slit portion by the value of a surface energy difference shown in Table 1.

The surface energy difference shown in Table 1 is the difference between the average value of the surface energy measured at intervals of 10 mm over a range of 300 mm from the longitudinally opposite ends of the slit portion and the surface energy in the central portion of the slit portion. Furthermore, the surface energy was measured by the above-described method.

Furthermore, current meters were installed at three positions, that is, in the central portion and at the opposite ends of the discharge port of the casting die. The current meters were used to measure the velocity of the dope discharged from the central portion and the velocity of the dope discharged from the opposite ends. Table 1 shows the velocity of the dope discharged from the opposite ends when the velocity of the dope discharged from the central portion is set to 1 (end flow velocity/central portion flow velocity).

Then, air at 40° C. was fed by a dryer disposed on the endless belt support side at 10 m/min to dry a web on the endless belt support. The dried web was released from the endless belt support to obtain a film. Immediately before the release, the film had a residual solvent rate of 80 mass %.

The released film was dried at 80° C. for one hour while being conveyed by a conveying roller. A stretching device (tenter) was used in an environment of 100° C. to stretch the dried film in a TD direction at a stretching ratio of 1.25 with the opposite ends of the film gripped by clips. During the stretching, the film had a residual solvent rate of 3 mass % to 10 mass %. The stretched film was dried at 125° C. for one hour while being conveyed by the conveying roller.

Subsequently, the dried film was wound around a winding device to obtain a resin film wound in a roll. The resin film obtained was cooled down to 20° C.

The resin film thus obtained was a cellulose ester film of 50 μm in film thickness and 2,200 mm in width.

Example 2 and Example 3

Example 2 and Example 3 are similar to Example 1 except that the treated layer in the casting die had a width D shown in Table 1.

Comparative Example 1

Comparative Example 1 is similar to Example 1 except that a casting die was used which was not plated using ultra chrome produced by EDI.

Example 4

Example 4 is similar to Comparative Example 1 except that a casting die was used in which the slit portion was 100 μm narrower at the opposite ends thereof than in the central portion thereof in the longitudinal direction.

Example 5

Example 5 is similar to Comparative Example 1 except that a casting die was used in which the slit portion was 300 μm narrower at the opposite ends thereof than in the central portion thereof in the longitudinal direction.

Comparative Example 2

Comparative Example 2 is similar to Comparative Example 1 except that a casting die was used in which the slit portion was 400 μm narrower at the opposite ends thereof than in the central portion thereof in the longitudinal direction.

Comparative Example 3

Comparative Example 3 is similar to Example 1 except that the treated layer in the casting die had a width D shown in Table 1.

Resin films obtained as described above (Examples 1 to 5 and Comparative Examples 1 to 3) were evaluated as follows, with the results of the evaluation shown in Table 1.

(Optical Characteristics)

The in-plane retardation Ro of each of the resin films obtained was measured at intervals of 10 mm in the width direction (lateral direction) of the film using an automatic birefringence measuring apparatus (KOBRA-21ADH produced by Oji Scientific Instruments). Specifically, the measurement was carried out using the automatic birefringence meter KOBRA-21ADH (produced by Oji Scientific Instruments) at a wavelength of 590 nm in an environment of a temperature of 23° C. and a humidity of 55% RH.

The in-plane retardation Ro was measured at 10 points. The measured values were averaged, and a variation in Ro with respect to the average value was calculated. When the variation was 3% or less, the evaluation result was represented by "o". When the variation was more than 3%, the evaluation result was represented by "x".

The variation is the difference between the average value and a value Ro deviating most from the average value divided by the average value.

(Bubble Entrainment)

Whether or not bubbles were entrained in the resin film was visually checked.

When no bubbles were found to be entrained in the resin film, the evaluation result was represented by "A". When a slight amount of bubbles were found to be entrained in the resin film but the film was at such a level that the film poses no problem when used as a protective film for a polarizing plate, the evaluation result was represented by "B". When a surface defect resulting from the entrainment of bubbles was at such a level that the film poses a problem when used as a protective film for a polarizing plate, the evaluation result was represented by "C".

The results are shown in Table 1.

TABLE 1

| | end flow velocity/central-portion flow velocity | surface energy difference (mN/m) | width D of treated layer (mm) | variation in Ro (%) | | bubble entrainment |
|---|---|---|---|---|---|---|
| Example 1 | 0.95 | 5 | 30 | 1.50 | o | B |
| Example 2 | 0.97 | 10 | 70 | 0.85 | o | A |
| Example 3 | 0.98 | 25 | 260 | 0.60 | o | A |
| Example 4 | 1.1 | 0 | 0 | 0.72 | o | A |
| Example 5 | 1.4 | 0 | 0 | 1.32 | o | B |
| Comparative Example 1 | 0.9 | 0 | 0 | 3.10 | x | C |
| Comparative Example 2 | 1.6 | 0 | 0 | 3.60 | x | C |
| Comparative Example 3 | 1.6 | 32 | 600 | 3.60 | x | C |

As seen in Table 1, the occurrence rate of a defect resulting from bubble entrainment at the ends of the resin film or a variation in the optical values such as Ro for the ends is lower when the end flow velocity/central-portion flow velocity is 0.95 to 1.5 (Examples 1 to 5) than when the end flow velocity/central-portion flow velocity is lower than 0.95 (Comparative Example 1) and when the end flow velocity/central-portion flow velocity is higher than 1.5 (Comparative Example 2 and Comparative Example 3). Hence, Examples 1 to 5 enable possible defects resulting from the entrainment of bubbles or the vibration of the support to be suppressed, providing a method for producing a resin film with the ends of the film restrained from becoming defective. In Comparative Example 1, the discharge port of the casting die was not plated at the longitudinally opposite ends thereof. In Comparative Example 2, the width of the slit portion at the longitudinally opposite ends thereof was excessively small compared to the width of the slit portion in the longitudinally central portion thereof. In Comparative Example 3, the width D of the treated layer was excessively large. Furthermore, in Comparative Example 2 and Comparative Example 3, the end flow velocity is expected to have been excessively high to stretch the central portion of a cast membrane, leading to a significant variation in the optical values such as Ro.

The Description discloses various aspects of techniques as described above. Several main techniques will be described below.

An aspect of the present invention is a method for producing a resin film, including a casting step of casting a resin solution containing a transparent resin from a casting die onto a running support to form a cast membrane, and a releasing step of releasing the cast membrane from the support, wherein, in the casting step, a velocity at which the resin solution is discharged from longitudinally opposite ends of a discharge port of the casting die is 0.95 times to 1.5 times a velocity at which the resin solution is discharged from a longitudinally central portion of the discharge port of the casting die.

Such a configuration enables provision of a method for producing a resin film restrained from becoming defective at the ends thereof.

The method is expected to be provided for the following reason.

First, according to the above-described configuration, dope discharged from the longitudinally opposite ends of the discharge port in the casting die lands the support at a position equivalent or close to a position where dope discharged from the longitudinally central portion of the discharge port in the casting die lands the support. This is expected to be because the velocity of the dope discharged from the opposite ends is equivalent to or slightly higher than the velocity of the dope discharged from the central portion as described above.

Thus, casting the dope onto the support is expected to restrain bubbles from being entrained in the ends of the cast membrane formed by casting the dope onto the support. Hence, casting the dope onto the support is expected to restrain the ends of the resin film from becoming defective as a result of the entrainment of bubbles.

Moreover, since the velocity of the dope discharged from the opposite ends is equivalent to or slightly higher than the velocity of the dope discharged from the central portion, the dope firmly lands on ends of the support to allow the ends of the support to be restrained from being vibrated.

Hence, the ends of the cast membrane can be restrained from becoming wavy as a result of the vibration of the support, allowing the ends of the obtained resin film from suffering from possible surface defects such as lateral steps. This is expected to be able to suppress a variation in the optical values for the ends of the resin film.

As described above, the aspect of the present invention is expected to be able to restrain the ends of the resin film from becoming defective as a result of the entrainment of bubbles or the vibration of the support. Thus, the aspect of the present invention can provide a method for producing a resin film restrained from becoming defective at the ends thereof.

Furthermore, in the method for producing a resin film, the resin solution preferably has a viscosity of 30 Pa·s to 80 Pa·s as measured at 30° C. using a rotational viscosimeter.

Such a configuration enables efficient production of a resin film restrained from becoming defective at the ends thereof. The use of such dope with a relatively high viscosity allows a resin film to be efficiently produced but generally tends to be likely to make the film defective at the ends thereof. However, the above-described method for producing a resin film can improve the production efficiency while restraining the resin film from becoming defective at the ends thereof.

Additionally, in the method for producing a resin film, the running speed of the support is preferably 60 m/min to 150 m/min.

Such a configuration enables efficient production of a resin film restrained from becoming defective at the ends thereof. The relatively high running speed of the support allows a resin film to be efficiently produced but generally tends to be likely to make the film defective at the ends thereof. However, the above-described method for producing a resin film can improve the production efficiency while restraining the resin film from becoming defective at the ends thereof.

In addition, in the method for producing a resin film, the resin film preferably has a width of 1,500 mm to 3,000 mm. In general, such a wide resin film tends to be likely to make the film defective at the ends thereof. However, the above-described producing method can provide a resin film restrained from becoming defective at the ends thereof.

Another aspect of the present invention is a casting die for casting a resin solution containing a transparent resin onto a running support to form a cast membrane, the die including a slit portion through which the resin solution passes, wherein longitudinally opposite ends of the slit portion are subjected to a surface treatment in such a manner that a velocity at which the resin solution is discharged from longitudinally opposite ends of a discharge port of the casting die is 0.95 times to 1.5 times a velocity at which the resin solution is discharged from a longitudinally central portion of the discharge port of the casting die.

Producing a resin film using the casting die configured as described above provides a resin film restrained from becoming defective at the ends thereof.

Furthermore, in the casting die, the longitudinally opposite ends of the slit portion has a surface energy which is lower than that of a central portion of the slit portion by 10 mN/m to 30 mN/m.

Producing a resin film using the casting die configured as described above provides a resin film restrained from becoming defective at the ends thereof. This is expected to be because the longitudinally opposite ends of the slit portion have low surface energy, low liquid repellency against the dope, and high smoothness.

Another aspect of the present invention is a device for producing a resin film, including a support that is able to run, a casting die for casting a resin solution containing a transparent resin onto the running support to form a cast membrane on the support, and a releasing portion that releases the cast membrane from the support, wherein the casting die is the above-described casting die.

Such a configuration enables provision of a device for producing a resin film restrained from becoming defective at the ends thereof.

Another aspect of the present invention is a resin film obtained by the method for producing a resin film.

Such a configuration enables provision of a resin film restrained from becoming defective at the ends thereof. Thus, even when the resin film obtained is cut at the ends thereof, the cut area can be reduced. Moreover, the need to cut the ends of the resin film may be avoided. Hence, a wide resin film is obtained and can be applied to an image display area of a liquid crystal display device with a larger screen.

Another aspect of the present invention is a polarizing plate including a polarizing element and a transparent protective film disposed on a surface of the polarizing element, wherein the transparent protective film is the above-described resin film.

Even when a wide resin film is used as a transparent protective film for a polarizing element, since the applied resin film is restrained from becoming defective at the ends thereof, the above-described configuration provides a polarizing plate which, when applied to, for example, a liquid crystal display device, serves to improve the image quality, that is, the contrast or the like, of the liquid crystal display device. Moreover, if a wide resin film is used as a transparent protective film for a polarizing element, the resultant polarizing plate can also be applied a liquid crystal display device with a larger screen.

Another aspect of the present invention is a liquid crystal display device including a liquid crystal cell and two polarizing plates disposed to sandwich the liquid crystal cell therebetween, wherein at least one of the two polarizing plates is the above-described polarizing plate.

Such a configuration uses the polarizing plate with the resin film restrained from becoming defective at the ends thereof. Thus, the image quality, that is, the contrast or the like, of a liquid crystal display device can be improved. Moreover, using a wide resin film as a transparent protective film for a polarizing plate allows a screen of the liquid crystal display device to be increased in size.

Industrial Applicability

The present invention provides a method for producing a resin film restrained from becoming defective at the ends thereof. The present invention also provides a casting die for use in the producing method, a device for producing a resin film which device includes the casting die, a resin film obtained by the producing method, a polarizing plate including the resin film used as a transparent protective film, and a liquid crystal display device including the polarizing plate.

The invention claimed is:

1. A method for producing a resin film, comprising:
   a casting step of casting a resin solution containing a transparent resin from a casting die onto a running support to form a cast membrane; and
   a releasing step of releasing the cast membrane from the support,
   wherein the casting die includes a manifold portion, a discharge port through which the resin solution is discharged and cast onto the support, and a slit portion between the manifold portion and the discharge port to allow the resin solution to pass from the manifold portion toward the discharge port,
   in the casting step, a discharge velocity at which the resin solution is discharged from longitudinally opposite ends of a discharge port of the casting die is 0.95 times to 1.5 times a discharge velocity at which the resin solution is discharged from a longitudinally central portion of the discharge port of the casting die, and
   the slit portion is subjected to a surface treatment which is an ultrachrome plating treatment and the treatment is only at longitudinally opposite ends of the slit portion so that each of the longitudinally opposite ends of the slit portion has a surface energy which is lower than that of a central portion of the slit portion by 10 mN/m to 30 mN/m, thereby setting the discharge velocity at the longitudinally opposite ends of the discharge port to be 0.95 to 1.5 times the discharge velocity in the longitudinally central portion of the discharge port.

2. The method for producing a resin film according to claim 1, wherein the resin solution has a viscosity of 30 Pa·s to 80 Pa·s as measured at 30° C. using a rotational viscosimeter.

3. The method for producing a resin film according to claim 1, wherein a running speed of the support is 60 m/min to 150 m/min.

4. The method for producing a resin film according to claim 1, wherein the resin film has a width of 1,500 mm to 3,000 mm.

5. A casting die for casting a resin solution containing a transparent resin onto a running support to form a cast membrane, the die comprising:
   a manifold portion, a discharge port through which the resin solution is discharged and cast onto the support, and a slit portion between the manifold portion and the discharge port to allow the resin solution to pass from the manifold portion toward the discharge port,
   the split portion is subjected to a surface treatment which is an ultrachrome plating treatment and the treatment only at longitudinally opposite ends of the split portion so that each of the longitudinally opposite ends of the split portion has a surface energy which is lower than that of a central portion of the split portion by 10 mN/m to 30 mN/m, thereby setting the discharge velocity at the longitudinally opposite ends of the discharge port to be 0.95 to 1.5 times the discharge velocity in the longitudinally central portion of the discharge port.

6. A device for producing a resin film, comprising:
   a support that is able to run;
   a casting die for casting a resin solution containing a transparent resin onto the running support to form a cast membrane on the support; and
   a releasing portion that releases the cast membrane from the support,
   wherein the casting die is the casting die comprises, a manifold portion, a discharge port through which the resin solution is discharged and cast onto the support, and a slit portion between the manifold portion and the discharge port to allow the resin solution to pass from the manifold portion toward the discharge port, and
   the split portion is subjected to a surface treatment which is an ultrachrome plating treatment and the treatment only at longitudinally opposite ends of the split portion so that each of the longitudinally opposite ends of the split portion has a surface energy which is lower than that of a central portion of the split portion by 10 mN/m to 30 mN/m, thereby setting the discharge velocity at the longitudinally opposite ends of the discharge port to be 0.95 to 1.5 times the discharge velocity in the longitudinally central portion of the discharge port.

* * * * *